United States Patent [19]

Spetner

[11] 4,053,192

[45] Oct. 11, 1977

[54] MODULAR FURNITURE

[76] Inventor: Norman Spetner, 7108 Delmar Blvd., St. Louis, Mo. 63130

[21] Appl. No.: 647,940

[22] Filed: Jan. 9, 1976

[51] Int. Cl.² .............................................. A47B 87/00
[52] U.S. Cl. .................................... 312/107; 312/111; 312/257 R; 52/288; 52/471; 52/589
[58] Field of Search ........... 312/257 R, 257 A, 111 R; 52/752 D

[56] References Cited

U.S. PATENT DOCUMENTS

| 909,055 | 1/1909 | Bowers | 52/753 D |
|---|---|---|---|
| 949,233 | 2/1910 | Holtgrewe | 312/257 R |
| 1,516,692 | 11/1924 | Andreas | 292/76 R |
| 2,570,609 | 10/1951 | Taylor | 312/257 R |
| 2,594,928 | 4/1952 | Horowitz | 52/753 D |
| 2,766,092 | 10/1956 | Dennison | 312/257 R |
| 3,031,125 | 4/1962 | Felton | 312/111 R |
| 3,284,152 | 11/1966 | Schorghuber | 312/257 R |
| 3,836,217 | 9/1974 | Shiina | 312/257 R |

FOREIGN PATENT DOCUMENTS

| 223,529 | 2/1962 | Austria | 52/753 D |
|---|---|---|---|
| 1,029,444 | 6/1953 | France | 52/753 D |

Primary Examiner—Paul R. Gilliam
Assistant Examiner—Victor N. Sakran
Attorney, Agent, or Firm—Cohn, Powell & Hind

[57] ABSTRACT

This modular furniture is formed from components of varying size and configuration which can be connected together to form different furniture combinations. Each component includes two pairs of opposed panels, which are provided with chamfered side edges and adjacent grooves. The panels are interconnected by corner-forming rails having angularly related legs terminating in elongate lips which are received within associated panel grooves to hold the chamfered edges of the panels together in a box-like formation. The legs of the rails provide cooperating outstanding bearing faces spaced from the panels, and adjacent panels of corresponding components are connected by fasteners tending to draw the panels toward each other. The components can be modified to be fitted with individual covers.

3 Claims, 13 Drawing Figures

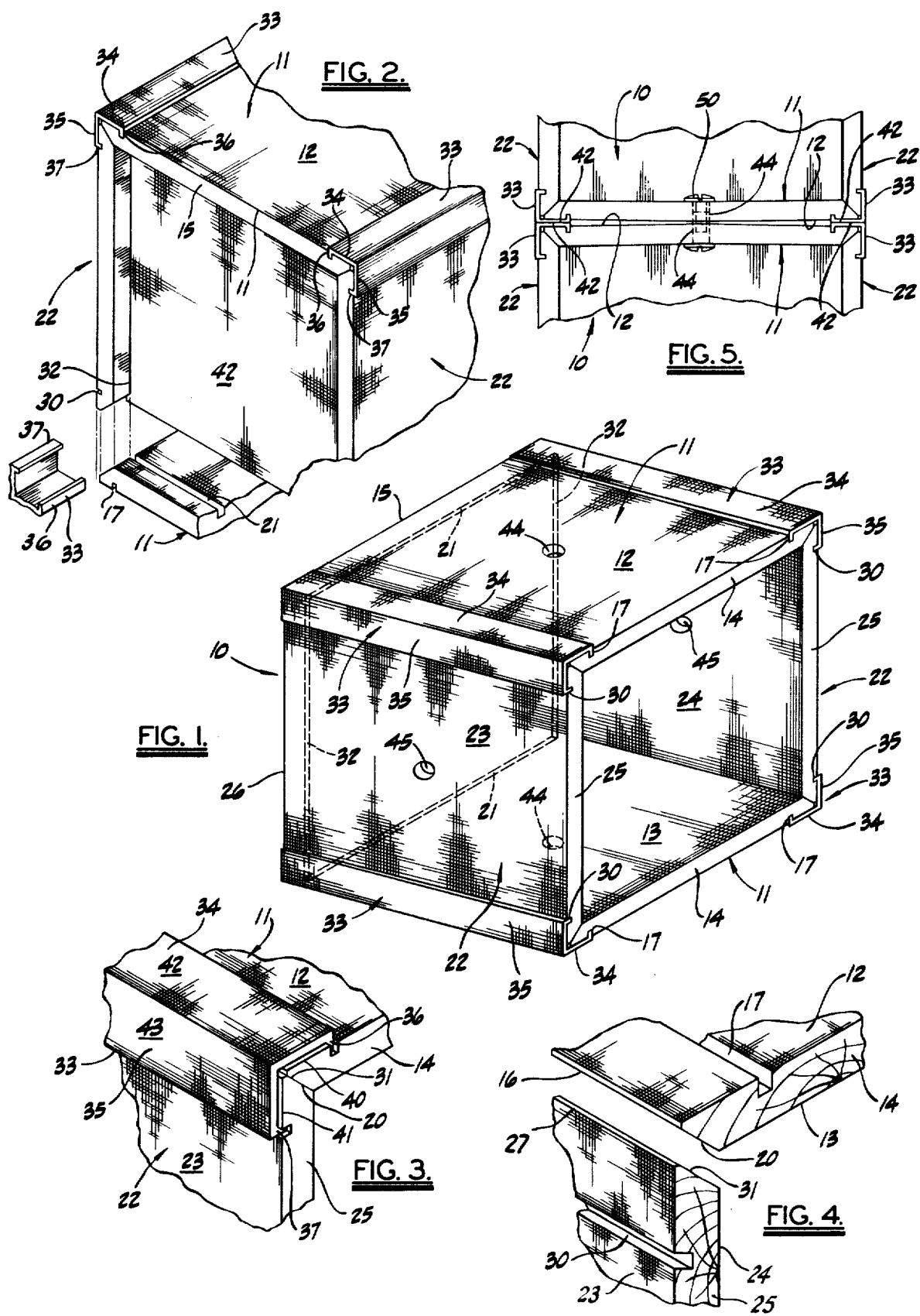

MODULAR FURNITURE

BACKGROUND OF THE INVENTION

This invention relates generally to modular furniture and in particular to box-like components which are connected at the corners by bearing rails.

Many attempts have been made to provide consumers with easy to erect furniture in the form of components, which are interconnected to serve as bookcases, shelving and cabinets for stereo equipment. Unfortunately, most known modular furniture suffers from serious disadvantages. One of these disadvantages results from the desire to conceal unsightly connections, and has inevitably produced complicated, and therefore expensive, corner joint constructions. Another disadvantage lies in the lack of versatility available in the furniture combinations resulting from the use of modular components which are identical in size and shape. Another related problem has been the attempt to use interlocking elements for connecting the modular component combinations together without the use of fasteners.

The present modular furniture solves these and other problems in a manner not disclosed in the known prior art.

SUMMARY OF THE INVENTION

This modular furniture provides components which can be connected together in combinations to produce bookcases, shelving and cabinets and can also be used individually to provide chests, tables and the like.

The corner connections of the individual components provide an effective concealment of the joint, and the components are connected in stacked, combination structures without the need for complicated interlocking elements.

The modular components can be of varying size and shape to provide a wide range of versatility in the combination structure.

It is an important object of this invention to provide a modular furniture component which includes a plurality of angularly related panels, each panel including a flat outer face having a pair of parallel side margins with associated parallel grooves adjacent thereto, each panel including a flat inner face having a pair of parallel chamfered side edges engageable with the chamfered side edges of an adjacent panel, and to provide a plurality of elongate rails interconnecting adjacent panels, each rail including angularly related outstanding legs having lengthwise extending lips receivable within associated grooves of adjacent panels to form a corner between said panels, said rails providing outstanding bearing faces engageable with the spaced bearing faces of at least one other component.

Another object is to provide each panel with a groove extending perpendicularly of the chamfered edges, said grooves receiving a transverse stiffener.

It is an object of this invention to provide fastener means extending between corresponding outer faces of two components to urge said faces toward each other and to urge the rail bearing faces into frictional engagement.

Yet another object of this invention is to provide a plurality of stackable components, the length of one side of at least one component being twice the length of at least one side of one other component.

An object is to provide a plurality of stackable components each having an open front end in the vertical plane, and to provide at least one of said components with a hinged cover closing the opening thereof.

Another object is to provide a component having an open upper end and to provide said component with a cover which includes a substantially flat plate having connection means interengageable with said perpendicularly extending grooves, said connection means including clip means attached to the cover whereby said cover provides a stiffening means for the component.

It is an important object of this invention to provide a modular furniture component which is simple and inexpensive to manufacture and which can be readily broken down for mailing and storing and is easily assembled, and to provide a component which can be combined with other components with a minimum of effort to produce a variety of combination structures.

BRIEF DESCRIPTION OF THE DRAWINGS

FIG. 1 is a perspective view of a typical furniture component viewed from the front;

FIG. 2 is a fragmentary perspective view of the same component viewed from the rear;

FIG. 3 is an enlarged detail illustrating a corner connection of said component;

FIG. 4 is a similar, exploded, view omitting the corner rail;

FIG. 5 is a fragmentary front elevational view illustrating the connection of two components;

DESCRIPTION OF THE PREFERRED EMBODIMENT

Figure 7:
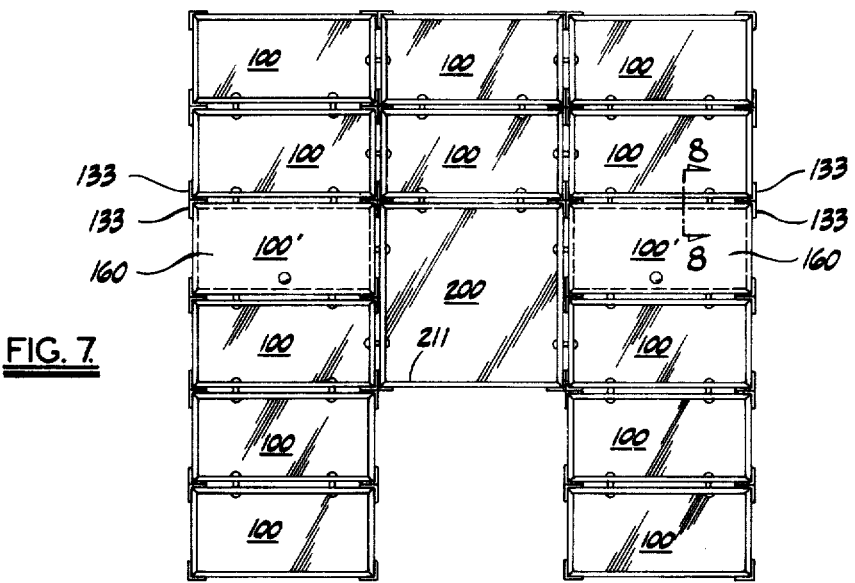
FIG. 7 is a front elevational view illustrating another assembly of components.

Referring now by characters of reference to the drawings and first to FIGS. 1 through 5, it will be understood that the particular component illustrated is indicated by numeral 10 and includes a plurality of panels arranged in first and second opposed pairs 11 and 22 respectively and formed from particle board, wood or similar material. Panels 11 include outer and inner faces 12 and 13 and front and rear ends 14 and 15 respectively. Outer faces 12 are defined by opposed, parallel side margins 16 having grooves 17 disposed adjacent thereto. Inner faces 13 are defined by parallel chamfered side edges 20 having a perpendicular groove 21 extending therebetween. Panels 22 include outer and inner faces 23 and 24 and front and rear ends 25 and 26. Outer faces 23 are defined by side margins 27 and grooves 30 disposed adjacent thereto. Inner faces 24 are defined by parallel chamfered side edges 31 having a perpendicular groove 32 extending therebetween.

Importantly, the corners of the components are formed and reinforced by means of elongate rails generally indicated by numeral 33. Each of said rails 33, as clearly shown in FIG. 3, includes perpendicularly disposed outstanding legs 34 and 35 terminating in inwardly depending, lengthwise extending lips 35 and 37 respectively being received in sliding relation within associated grooves 17 and 30. As best shown by FIGS. 3 and 4, the legs 34 and 35 include inner faces 40 and 41 respectively bearing on the outer faces 12 and 23 respectively of panels 11 and 22. This structural arrangement of parts provides that the chamfered edges 20 and 31 of said panels 11 and 22 are engageable with each other and are held together by the rails 33.

The perpendicular grooves 21 and 32, which are provided adjacent the rear end of the panels 12 and 22, are of a width and depth to receive an end plate indicated by numeral 42 in FIG. 2. Said plate 42 constitutes a stiffener means and ensures that the corners of the component 10 are maintained in a correct angular relation.

The method of assembly of the component 10 is quite simple and is best understood by particular reference to FIG. 2 read in conjunction with FIG. 4. Briefly, the chamfered edges 20 and 31 of panels 11 and 12 are disposed in abutting relation and the lips 36 and 37 of the upper corner rail 33 are slip into position within grooves 17 and 30 respectively. When the upper panel 11 and two side panels 22 have been assembled the end of plate 44 can be slid into place within the perpendicular side grooves 32 and the upper groove 21. Following this, it is a simple matter to position the lower panel 11 against associated side panels 22 so that the end plate 42 is received within the lower perpendicular groove 21, at which time the lips 36 and 37 of lower rails 33 can be slid into position within associated grooves 17 and 30 to complete the assembly. When broken down for mailing or storing, the panels 11 and 12 are simply stacked together and the rails 33 disposed alongside said panels to form a compact package.

As clearly shown in FIGS. 1 and 5, the panels 11 and 22 in the preferred embodiment are provided with openings 44 and 45 respectively. Importantly, as particularly shown in FIG. 5, the corresponding openings 44 in the adjacent panels 11 of stacked components 10 are aligned when the components are aligned and provide a means of connecting said components together when a fastener, indicated by numeral 50, is received by said openings. It will be observed from FIG. 5 that the fastener 50, when tightened, tends to draw the outer faces 12 of the adjacent panels 11 together. It will be understood that the structural disposition of the rails 33 relative to the panels 11 is such that the legs 34 of said rails are seated on the outer face 12 and hence project outwardly of said outer face by an amount equal to the thickness of said legs 34 to provide a gap between adjacent panels 11 equal to twice the thickness of said rail legs 34. Thus, when the fasteners 50 are tightened, the panels 11 are, in effect, urged toward each other. The result is that the engaging faces of the leg outer faces 42 are under a spring-loaded reactive force tending to retain the components 10 in alignment by frictional engagement of the bearing.

Figure 6:
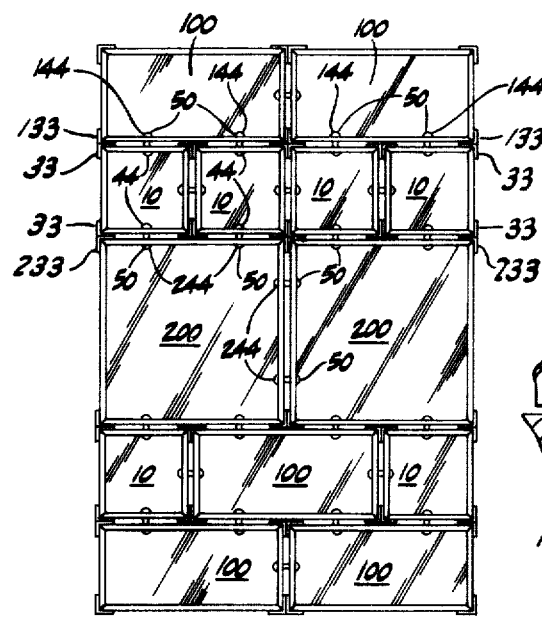
FIG. 6 is a front elevational view illustrating an assembly of components.

It will be understood that, although component 10 shown in FIG. 1 is substantially cubular, this configuration can be modified. Such modification is desirable, particularly when combinations of components are utilized to construct bookshelves, desks, cabinets and the like, as illustrated in FIGS. 6 and 7. FIG. 6 illustrates the use of cubular components 10 in conjunction with other components indicated by numerals 100 and 200 respectively. All of the components 10, 100 and 200 are of the same depth but are of different height and/or width. For example, components 100 are twice the width but the same height as components 10. Components 200, on the other hand, are twice the width and twice the height of said components 10. However, notwithstanding these modifications as to size, it will be understood that the corner construction of components 100 and 200 is identical with the construction illustrated in FIG. 1. Similar parts are similarly identified with prefix added eg rails 133 and 233. Only the panel size and the stiffener size are changed, together with the number of openings which are provided to receive fasteners 50. For example, as shown in FIG. 6, two openings indicated by numeral 144 are provided in components 100, and said openings are located in alignment with openings 44 provided in components 10 to receive fasteners 50. In a like manner, two openings 244 are provided in each side of components 200 in alignment with openings 44 in components 10 to receive fasteners 50. The rails, eg rails 33 and 133 are automatically aligned.

FIG. 7 illustrates a combination formed of a plurality of components 100 and a single component 200. The manner in which these components are connected is substantially the same as discussed above with respect to FIG. 6. However, FIG. 7 discloses two features not shown in FIG. 6. For example, it will be observed that the area immediately below component 200 is open, thereby providing leg space to permit the lower panel 211 of component 200 to be used as a desk top. In addition to this feature, FIG. 7 indicates the provision of a hinged cover 160 which is provided on the components indicated by numerals 100'. These components are identical with components 100 except for the provision of hinge elements which are indicated by numerals 161 in FIG. 8. It will be understood that in the preferred embodiment in which there is a gap between the component 100' and the superjacent component 100 equal to twice the thickness of the outstanding legs of the rails 133, the relatively thin hinge elements 161 can be received within this gap and still permit a degree of springing action when the fasteners 50 are tightened.

Figure 8:
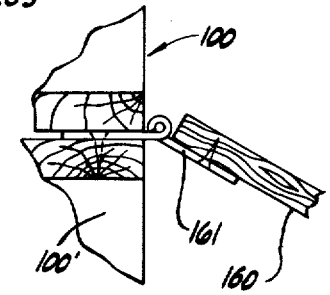
FIG. 8 is an enlarged cross sectional detail taken on line 8—8 of FIG. 7 illustrating a hinge connection of one component of FIG. 7.

FIG. 8 illustrates the use of a component, indicated by numeral 300, as a chest. This component 300 is substantially similar to component 100' described above. The panels 311 are twice the length of panels 322 and are vertical rather than horizontal. The stiffener plate 344 is horizontal and provides a bottom for the chest and a cover 360 is provided, which is hinged in the same manner as the cover 160. The rails 333 are attached to panels 311 and 322 in an identical manner to that described with respect to component 10. However, to avoid any possibility of an overhanging sharp edge of said rails 333, they are shorter than the connected panels.

Figure 10:
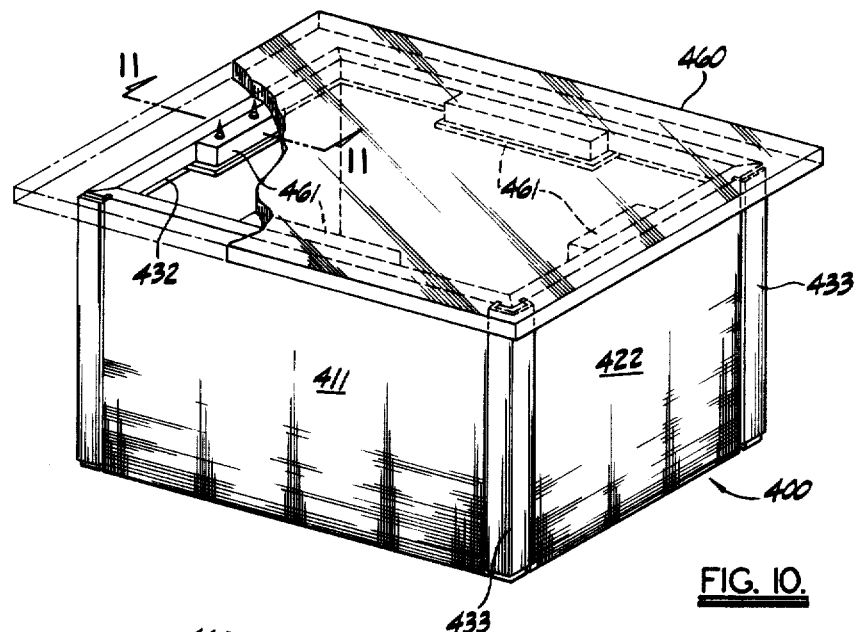
FIG. 10 is a perspective view of another component.
Figure 11:
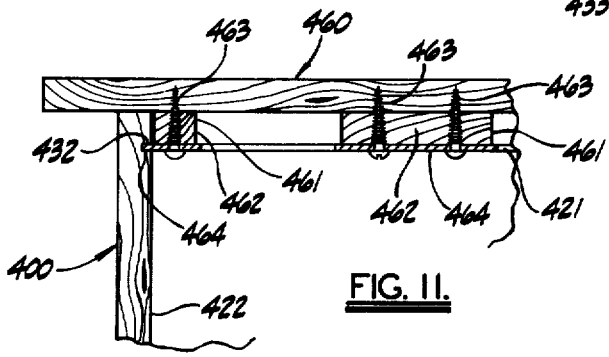
FIG. 11 is an enlarged fragmentary view taken on line 11—11 of FIG. 10.

FIG. 10 illustrates a similar rectangular component, indicated by numeral 300, used as a table. In this use, the table top 460 overhangs the vertical side panels 411 and 422 and is attached thereto by a connection means indicated by numerals 461. As shown in FIG. 11, the connection means consists os spacer blocks 462 attached as by a pair of screws 463 to the table top 460 and including a projecting lip 464. The projecting lip 464 is received within continuous grooves 432 and 421, which correspond to those provided for the stiffener end plate 44 shown in FIG. 1 and the connection means 461, in effect, cooperate with the table top 460 to provide a stiffener means holding the panels in correct alignment.

Figure 9:
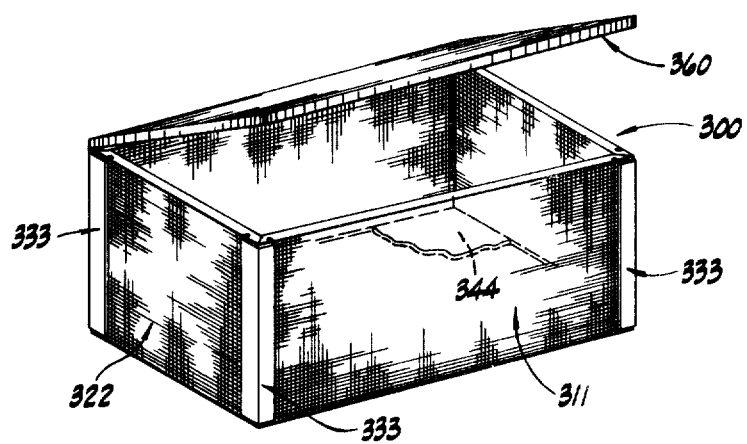
FIG. 9 is a perspective view of a modified component.

It will be understood that the corner construction is provided by rails 433 which are similar to those provided for the chest component 300 shown in FIG. 9 and that the table top 460 is installed during the construction of the component in the manner described above with respect to component 10.

Figure 11A:
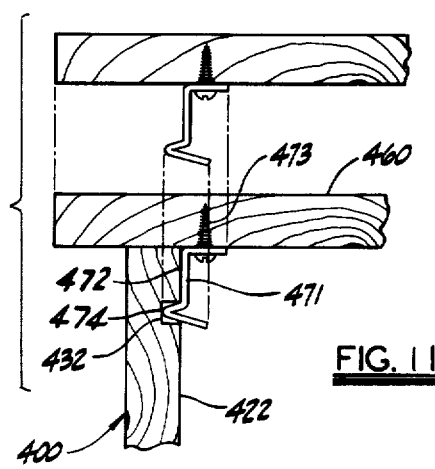
FIG. 11A is a similar view to FIG. 11 illustrating a modified connection.

FIG. 11A illustrates an alternative connection means for the table top 460. This connection means is provided by opposed clip elements 471, which are attached to the table top as by screws 473, and which include a downwardly depending leg 472 having a projecting lip 474. The clip element lips 474 are snapped into place as the table top 460 is moved downwardly from the position shown in phantom outline in FIG. 11A. It will be understood that the clip elements 471 are formed from a resilient material such as spring steel and that at least one clip element is provided on each of two opposed sides.

Figure 12:
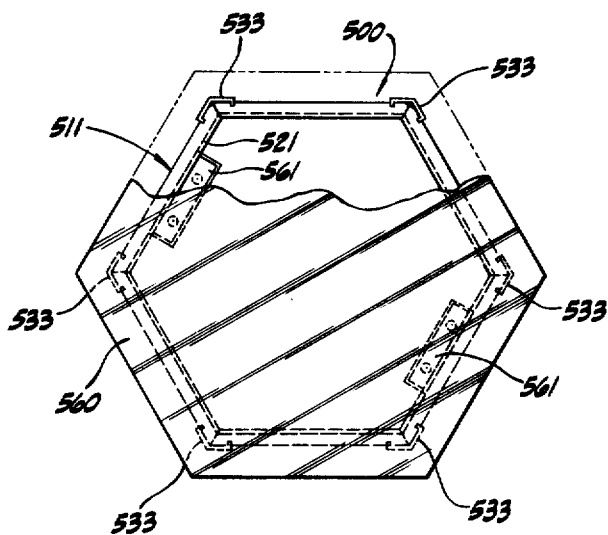
FIG. 12 is a plan view of another modified component.

FIG. 12 illustrates an alternative configuration of the component forming the base of the table. FIG. 12 thereby illustrates that the table is not limited to a rectangular formation but may be formed, for example, from a hexagonal component, such as that indicated by numeral 500. The component 500 is formed from a plurality of identical panels 511 interconnected by rails 533. It will be understood that the corner connection by rails 533 is the same as that described above with respect to the component 10 except for the change in the angular relationship between the legs of the rails 533 and the corresponding angular change of the chamfered edges, to suit the particular corner angle, which is 120° in the case of a hexagon rather than 90° as in the case of a rectangle. It will be further understood that when component 500 is used as the base for a table top, such as that indicated by numeral 560, the connection of said top can be made in the manner described above with respect to component 400, for example as by connection means 561 having a substantially identical formation to the connection means 461, each of said panels being provided with grooves 521.

In the preferred embodiments it has been found that a modular unit size of approximately 15 inches is suitable for most combination uses, such as those illustrated in FIGS. 6 and 7. With this basic dimension, the size for component 10 would be width 15 inches, height 15 inches; for component 100, width 30 inches, height 15 inches; and for component 200, width 30 inches and height 30 inches. In each case the depth of components 10, 100 and 200 is 15 inches.

I claim as my invention:

1. A modular furniture combination comprising:
   a. a plurality of stacked components each including:
      1. a plurality of stached components each including:
         I. a substantially flat outer face having a pair of parallel side margins and associated parallel grooves disposed adjacent said margins said face being planar on each side of said grooves, and
         II. a substantially flat inner face having a pair of parallel chamfered side edges and a perpendicular groove extending therebetween said chamfered edges being engageable with the chamfered side edges of an adjacent panel,
      2. a plurality of identical elongate rails interconnecting adjacent panels, each rail including:
         I. angularly related outstanding legs having transversely related, lengthwise extending lips receivable within associated outer face grooves of adjacent panels to form a corner between said panels, and
         II. each of said legs having an inner face engageable with an associated panel planar outer face and an outer face disposed in a plane spaced from the plane of said panel outer face to provide an outstanding bearing seat engageable by the corresponding outstanding rail bearing seat of a like component for stacking purposes to space corresponding panel outer faces between said rails apart.
      3. stiffener means receivable within said inner face grooves of the panels,
   b. at least one panel of one stacked component including at least one fastener opening disposed in the panel area between the rails substantially alignable with a corresponding fastener opening of a spaced panel of an adjacent stacked component, and
   c. fastener means receivable within said fastener openings and extending between the spaced apart outer surfaces of said corresponding panels of like stacked components tending to urge said spaced panels toward each other and connect said stacked components.

2. A modular furniture combination as defined in claim 1, in which:
   d. the length between parallel identical rails of one side of at least one connected stacked component is twice the length between parallel identical rails of at least one side of one other connected stacked component.

3. A modular furniture combination as defined in claim 1, in which:
   d. said stacked components provide a plurality of open ends in the same plane, and
   e. at least one stacked component includes a hinged cover hingedly attached to a panel closing the end opening thereof.

* * * * *